United States Patent [19]
Barkan

[11] Patent Number: 5,952,644
[45] Date of Patent: *Sep. 14, 1999

[54] BAR CODE READER WITH MULTIPLE SENSITIVITY MODES USING VARIABLE THRESHOLDING COMPARISONS

[76] Inventor: Edward Barkan, Three Enchanted Woods Ct., Miller Place, N.Y. 11764

[ * ] Notice: This patent issued on a continued prosecution application filed under 37 CFR 1.53(d), and is subject to the twenty year patent term provisions of 35 U.S.C. 154(a)(2).

[21] Appl. No.: 08/818,871

[22] Filed: Mar. 17, 1997

Related U.S. Application Data

[63] Continuation-in-part of application No. 08/480,802, Jun. 7, 1995, Pat. No. 5,612,531, which is a continuation-in-part of application No. 08/241,014, May 11, 1994, Pat. No. 5,436,440, which is a division of application No. 08/028,107, Mar. 8, 1993, Pat. No. 5,408,081, which is a continuation-in-part of application No. 07/721,951, Jun. 27, 1991, abandoned, which is a division of application No. 08/510,074, Aug. 1, 1995, Pat. No. 5,845,332, which is a continuation-in-part of application No. 07/367,335, Jun. 16, 1989, Pat. No. 5,124,539.

[51] Int. Cl.$^6$ .................................................. G06K 7/10
[52] U.S. Cl. .................................. 235/463; 235/436
[58] Field of Search .................... 235/462, 463, 235/436

[56] References Cited

U.S. PATENT DOCUMENTS 5,686,716  11/1997  La ........................................... 235/463

*Primary Examiner*—F. L. Evans
*Attorney, Agent, or Firm*—Finnegan, Henderson, Farabow, Garrett & Dunner, L.L.P.

[57] ABSTRACT

A multiple sensitivity-mode digitizer circuit for a bar code reader has circuits that perform two thresholding techniques. The bar code reader includes a first derivative circuit for receiving an analog signal from a scan of the bar code symbol and for generating a first derivative signal of the analog signal. The digitizer circuit includes a first thresholding circuit for generating a first digitized signal in response to a comparison between the first derivative signal and a first threshold representing a first detection sensitivity. A second thresholding circuit generates a second digitized signal in response to a comparison between the first derivative signal and a second threshold representing a second detection sensitivity. A mode selector selects as the output digitized signal one of the first digitized signal and a third digitized signal, the third digitized signal representing the first digitized signal modified by the second digitized signal. In addition, a bar code read may include circuitry for detecting and eliminating imperfections in a scanned bar code.

30 Claims, 10 Drawing Sheets

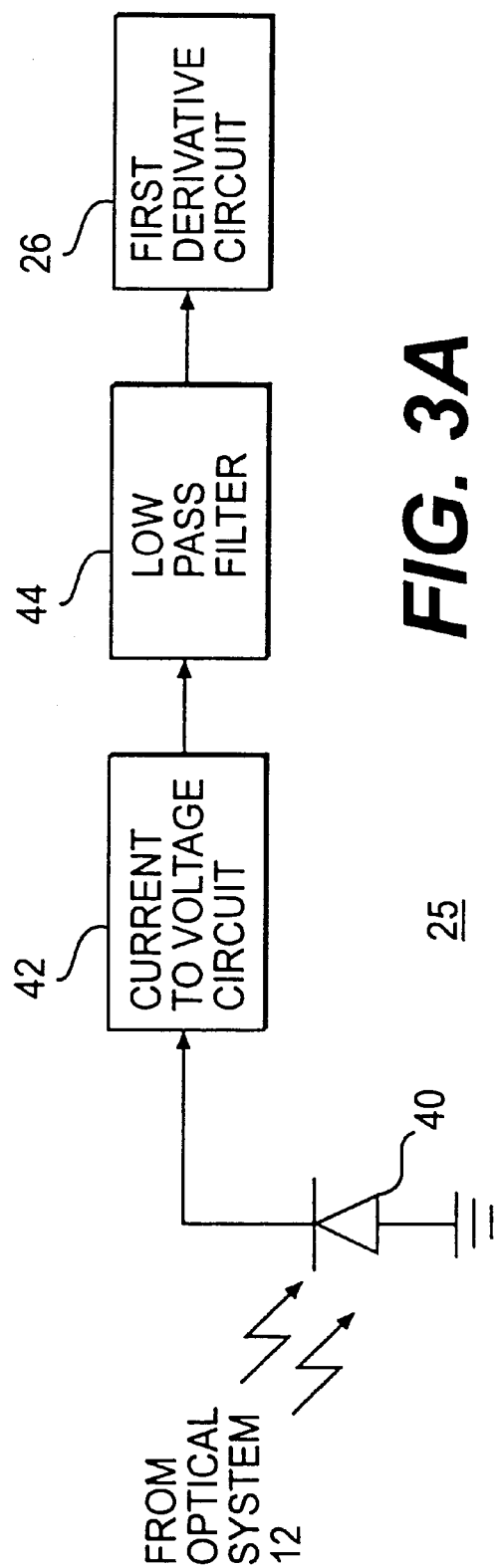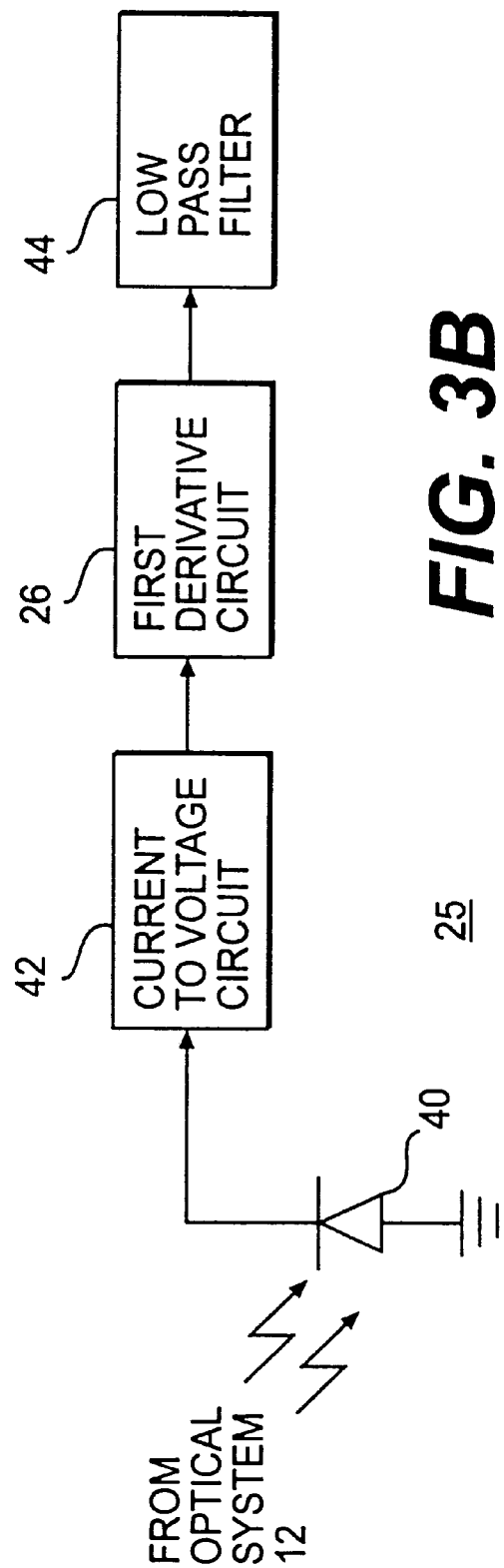

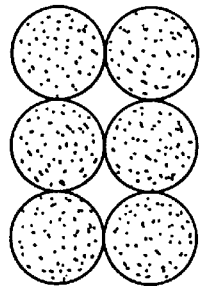
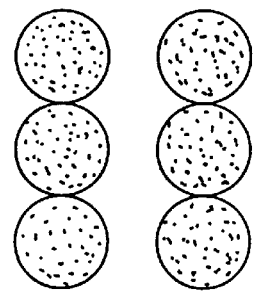
NORMAL
DOT MATRIX PRINT
POORLY PRINTED
DOT MATRIX
DETECTED
SIGNALS
*FIG. 8*

BAR CODE READER WITH MULTIPLE SENSITIVITY MODES USING VARIABLE THRESHOLDING COMPARISONS

CROSS-REFERENCE TO RELATED APPLICATIONS

This application is a continuation-in-part of U.S. Ser. No. 480,802 filed Jun. 7, 1995, now U.S. Pat. No. 5,612,531, which is a continuation-in-part application of U.S. Ser. No. 241,014 filed May 11, 1994, now U.S. Pat. No. 5,436,440, which is a divisional application of U.S. Ser. No. 028,107 filed Mar. 8, 1993, now U.S. Pat. No. 5,408,081, which is a continuation-in-part application of U.S. Ser. No. 721,951 filed Jun. 27, 1991, now abandoned, which is a divisional application of Ser. No. 510,074, filed Aug. 1, 1995 now U.S. Pat. No. 5,845,332, which is a continuation-in-part application of U.S. Ser. No. 367,335, filed Jun. 16, 1989, now U.S. Pat. No. 5,124,539. The contents of all the aforesaid applications are relied upon and expressly incorporated herein by reference.

BACKGROUND OF THE INVENTION

1. Field of the Invention

The present invention relates generally to a bar code reader and, more particularly, the present invention relates to a digitizer circuit for a bar code reader.

2. Discussion of the Related Art

Digitizers in bar code readers generally fall into one of two categories. One category, called diode thresholding digitizers, use diodes (usually in pairs) to set a threshold at which the digitizer will respond to modulations of the applied input signal. these digitizers will respond to a signal only when the change in magnitude of the input signal exceeds a forward voltage drop of a diode. Analog signals corresponding to the bar code symbol can be applied directly to the digitizer circuit, as in LS-7000 models from Symbol Technologies, Inc., the assignee of the present application, or a first derivative signal of the analog signal can be applied to the digitizer circuit.

In either case, diode thresholding allows a digitizer to digitize low levels of modulation of the analog signal. Hence, the first category of digitizers in bar code readers are useful for reading symbols with a large depth of focus for a given symbol density.

However, the features that allow these digitizers to provide a large depth of focus also make the digitizers sensitive to print defects on the symbol that cause relatively low levels of modulation of the analog signal. This is particularly a problem when a poor quality symbol is located near the waist of the laser beam (typically at about one to three inches from the nose of the scanner) where small defects are more easily resolved. As a result, hand-held laser scanners cannot read dot matrix symbols or other symbols with defects in this range using the first category of digitizers. However, these digitizers can read defective symbols by moving the scanner away from the symbol, causing the laser spot to grow larger. This renders the defects unresolvable.

The digitizer in the LS-2000 "Turbo" model of Symbol Technologies, Inc. is representative of the other category of digitizer, called a high-thresholding digitizer. High thresholding digitizers will not respond to modulations of the first derivative of the analog signal unless that modulation exceeds some pre-determined threshold. That threshold is a percentage of the height of modulation caused by the wide bars or spaces in the symbol being scanned.

High thresholding digitizers can have high enough thresholds to ignore printing defects that are small with respect to the laser spot. As a result, such digitizers can read poor quality symbols, even near the beam waist. Unfortunately, the ability to ignore printing defects makes this type of digitizer lack the large depth of focus of the diode thresholding digitizer.

Accordingly, conventional laser scanners that solve one problem create another. Digitizers sensitive enough to provide large depths of focus, give poor performance on defective symbols near the beam waist. Higher threshold digitizers work better on defective symbols near the beam waist, but have poor depth of focus.

There is a need for a laser scanner that can combine the strength of a sensitive diode thresholding digitizer and a high threshold digitizer. Such a scanner would be able to read a wider range of bar code symbols while maintaining high precision and accuracy.

SUMMARY OF THE INVENTION

Accordingly, the present invention is directed to a digitizer circuit of a bar code reader that substantially obviates one or more of the problems due to limitations and disadvantages of the prior art.

An advantage of the present invention is the provision of a digitizer circuit with multiple operating modes to scan and read bar code symbols accurately at different conditions.

The features and advantages of the invention will be set forth in the description which follows, and in part will be apparent from the description or may be learned by practice of the invention. The objectives and other advantages of the invention will be realized and attained by the apparatus and methods particularly pointed out in the written description and claims hereof as well as the appended drawings.

To achieve these and other advantages, and in accordance with the purpose of the invention, as embodied and broadly described, the invention is a multiple sensitivity-mode digitizer circuit for a bar code reader for generating an output digitized signal corresponding to data encoded in a scanned bar code symbol, the bar code reader having a first derivative circuit for receiving an analog signal from a scan of the bar code symbol and for generating a first derivative signal of the analog signal. The digitizer circuit includes a first thresholding circuit for generating a first digitized signal in response to a comparison between the first derivative signal and a first threshold, representing a first detection sensitivity. A second thresholding circuit generates a second digitized signal in response to a comparison between the first derivative signal and a second threshold representing a second detection sensitivity. A mode selector selects as the output digitized signal one of the first digitized signal and a third digitized signal, the third digitized signal representing the first digitized signal modified by the second digitized signal.

In another aspect, the bar code reader for scanning bar code symbols of the present invention comprises an optical system including a laser beam generator for scanning a bar code symbol; a sensor, responsive to the optical system, for generating an analog signal corresponding to the bar code symbol a first derivative circuit for generating a first derivative signal of the analog signal; and a digitizer circuit. The digitizer circuit includes a first thresholding circuit which generates a first digitized signal in response to a comparison between the first derivative signal and a first threshold representing a first detection sensitivity. A second thresholding circuit generates a second digitized signal in response to a comparison between the first derivative signal and a second threshold representing a second detection sensitivity. A mode selector selects as the output digitized signal one of the first digitized signal and a third digitized signal, the third digitized signal representing the first digitized signal modified by the second digitized signal.

In another aspect, a bar multiple sensitivity-mode bar code reader for decoding data encoded in a scanned bar code symbol includes a first derivative circuit for receiving an analog signal from a scan of the bar code symbol and for generating a first derivative signal of the analog signal. A first thresholding circuit generates a first digitized signal in response to a comparison between the first derivative signal and a first threshold representing a first detection sensitivity. A second thresholding circuit generates a second digitized signal in response to a comparison between the first derivative signal and a second threshold representing a second detection sensitivity. A mode selector selects as the output digitized signal one of the first digitized signal and a third digitized signal, the third digitized signal representing the first digitized signal modified by the second digitized signal. A decoder decodes the output digitized signal.

In another aspect, the invention provides a method for outputting an output digitized signal corresponding to an analog signal, the analog signal representing data encoded in a scanned bar code symbol. The method comprises the steps of generating a first derivative signal of the analog signal. A first digitized signal is generated in response to a comparison between the first derivative signal and a first threshold representing a first detection sensitivity. A second digitized signal is generated in response to a comparison between the first derivative signal and a second threshold representing a second detection sensitivity. The output digitized signal is selected from one of the first digitized signal and a third digitized signal, the third digitized signal representing the first digitized signal modified by the second digitized signal.

Both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate one embodiment of the invention, and together with the description serve to explain the principles of the invention.

In the drawings:

FIG. 3A is a detailed block diagram of an embodiment of the signal receiving unit of FIG. 2;

FIG. 3B is a detailed block diagram of another embodiment of the signal receiving unit of FIG. 2;

FIG. 8 is a diagram of an imperfect bar in a bar code;

DETAILED DESCRIPTION OF THE PREFERRED EMBODIMENTS

Reference will now be made in detail to the present preferred embodiments of the invention, an example of which is illustrated in the accompanying drawings.

Figure 1:
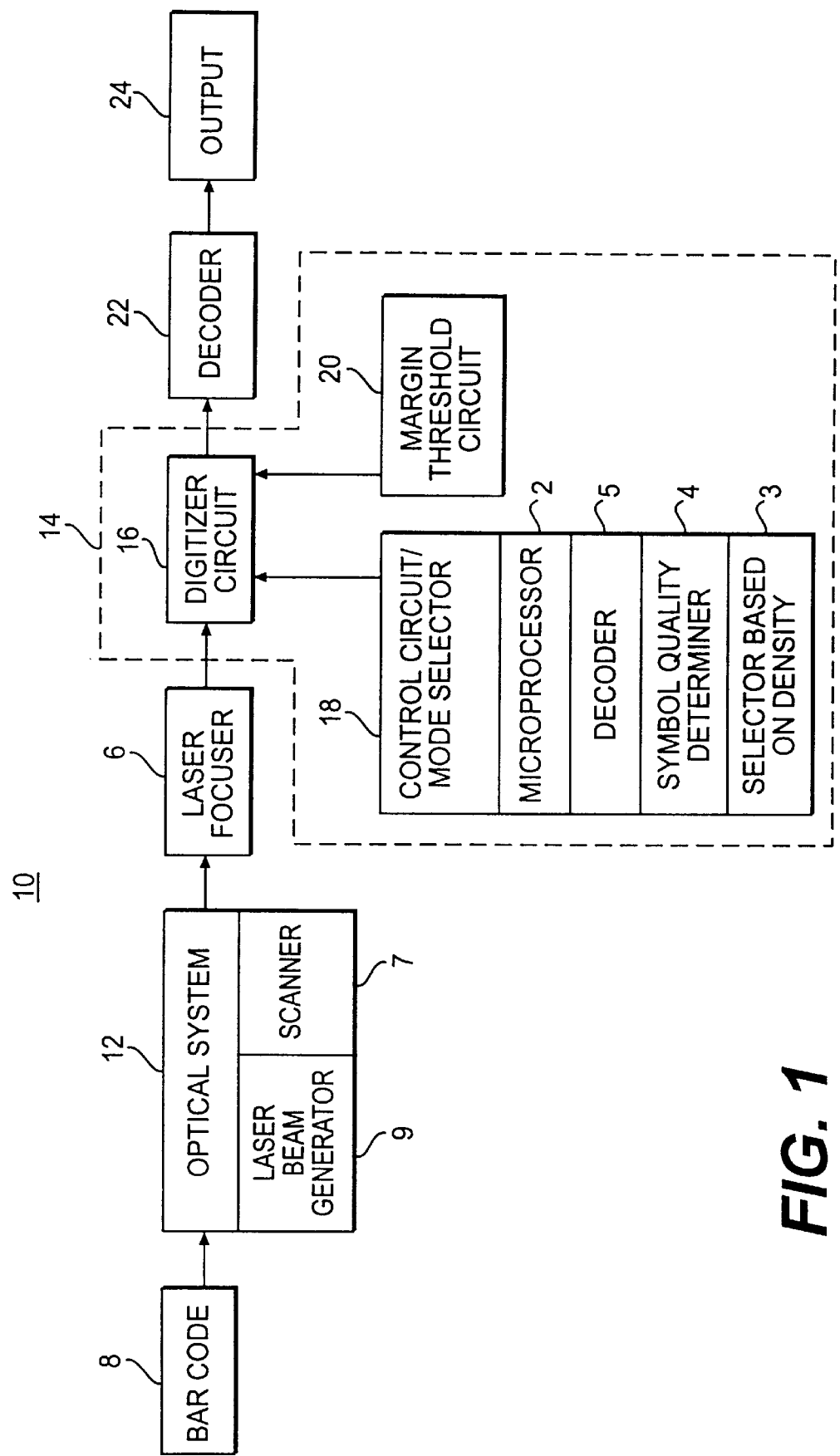
FIG. 1 is a block diagram of the bar code reader of the present invention.

FIG. 1 shows an exemplary embodiment of a bar code reader 10 including a digitizer circuit 16 according to the present invention. Bar code reader 10 includes an optical system 12 for reading a bar code 8, a digitizer 14, a decoder 22, and an output 24. The digitizer 14 includes a digitizer circuit 16, a control circuit/mode selector 18 having an optional microprocessor 2, and a margin threshold circuit 20. The optical system 12, which may optionally include an associated laser beam generator 9, scanner 7, and laser focuser 6, reads the bar code 8 and generates a corresponding analog signal, which is then sent to the digitizer 14. Control circuit/mode selector 18 may optionally also have a selector based on density device 3, a symbol density determiner 4, and a decoder 5.

The digitizer 14 processes the analog signal through the digitizer circuit 16 and generates a digitized signal corresponding to the bar code 8. The control circuit 18 and margin threshold circuit 20 control the digitizer circuit 16. The decoder 22 decodes the digitized signal from the digitizer 14 and presents the results at the output 24.

Figure 2:
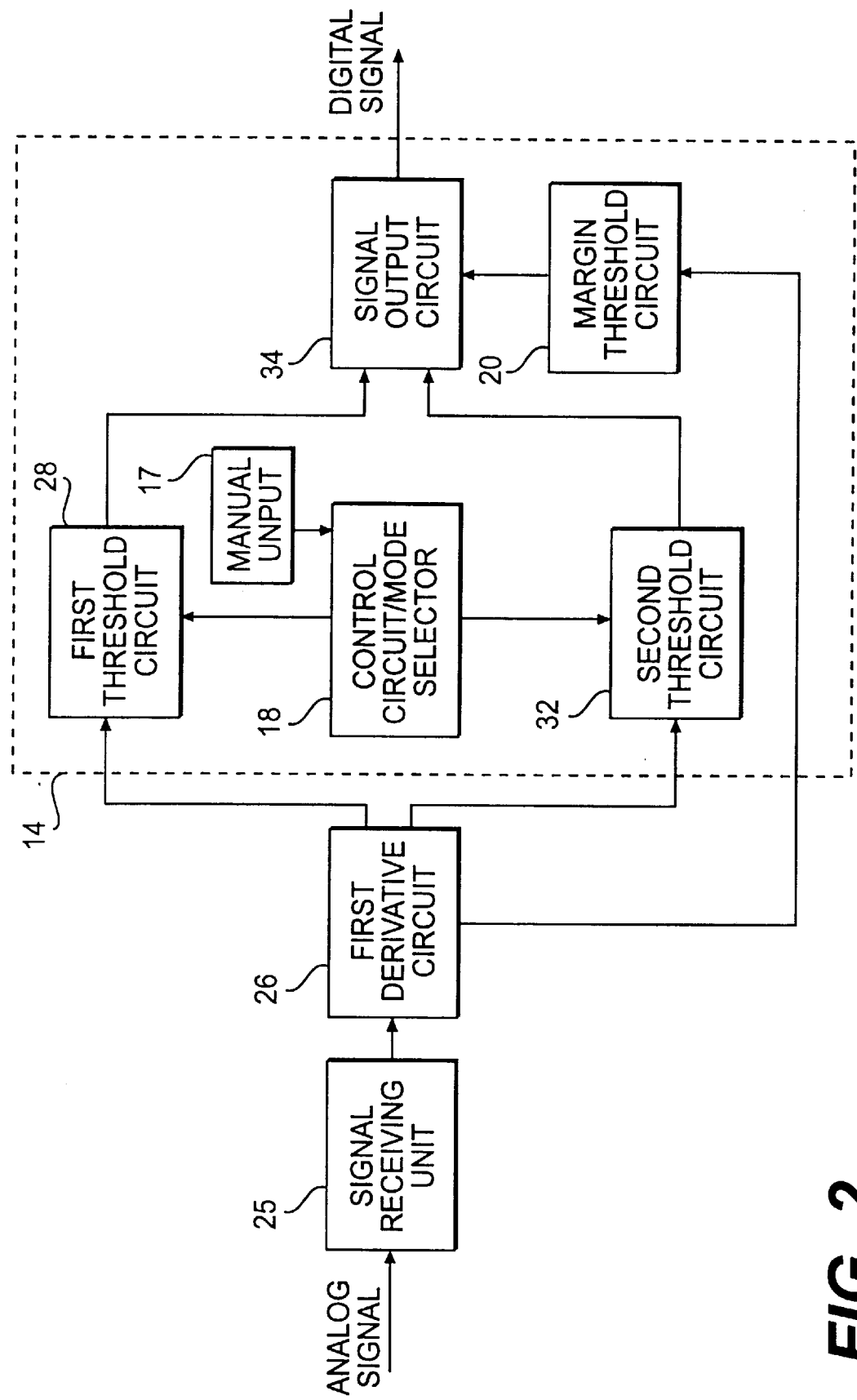
FIG. 2 is a more detailed block diagram of the digitizer circuit in the scanner of FIG. 1.

FIG. 2 shows a detailed block diagram of the digitizer 14 of FIG. 1. The digitizer circuit 16 of the digitizer 14 includes a signal receiving unit 25, a first derivative circuit 26, a first thresholding circuit 28, a second thresholding circuit 32, and a signal output circuit 34. After signal receiving unit 25 processes the analog signals corresponding to the optical signals read by optical system 12 from the bar code 8, the first derivative circuit 26 generates a first derivative of the analog signal.

The first derivative signal is an input to the first thresholding circuit 28 and second thresholding circuit 32. The first and second thresholding circuits respectively output first and second digitized signals which are sent to the signal output circuit 34 under the direction of the control circuit/mode selector 18. If the digitizer 14 is in a less sensitive mode, the control circuit 18 causes the output of both the first and second thresholding circuits 28 and 32 to be sent to the signal output circuit 34 which outputs a third digitized signal representing the first digitized signal as modified by the second digitized signal. The third digitized signal corresponds to peaks in the first derivative signal that are detected by both the first and second thresholding circuits. If the digitizer 14 is in a most sensitive mode, only the output signal from the first thresholding circuit 28 is sent to the signal output circuit 34 and that signal is output. The derivative signal is also an input to the margin threshold circuit 20 to control the output of the signal output circuit 34.

FIG. 3A shows one embodiment of the signal receiving unit 25 of FIG. 2. The optical system 12 includes a light-receiving circuit, such as a photodiode 40, to convert the optical signal to an electrical (current) signal. The signal receiving unit 25 includes current-to-voltage circuit 42 that converts the current signal from photodiode 40 to a voltage signal. The voltage signal passes through a low-pass filter 44 which outputs the resultant voltage signal to the first derivative circuit 26. The low-pass filter 44 may also be a part of the first derivative circuit 26. The current-to-voltage circuit 42, low-pass filter 44, and first derivative circuit 26 may be connected differently, for example, as shown in FIG. 3B. In FIG. 3B, the photodiode 40 converts the optical signal to a current signal which current-to-voltage circuit 42 converts to a voltage signal. The first derivative circuit 26 differentiates the voltage signal to produce a first derivative signal. The first derivative signal passes through the low-pass filter 44. An analog signal may be used directly. However, the first derivative signal is preferable for locating inflection points of the analog signal which correspond to edges of the bars and spaces. If the arrangement in FIG. 3B were used, the block diagram in FIG. 2 would need to be adjusted to reflect the change in position of circuit 26. The low pass filter 26 may also be a part of the first derivative circuit 26.

Figure 4:
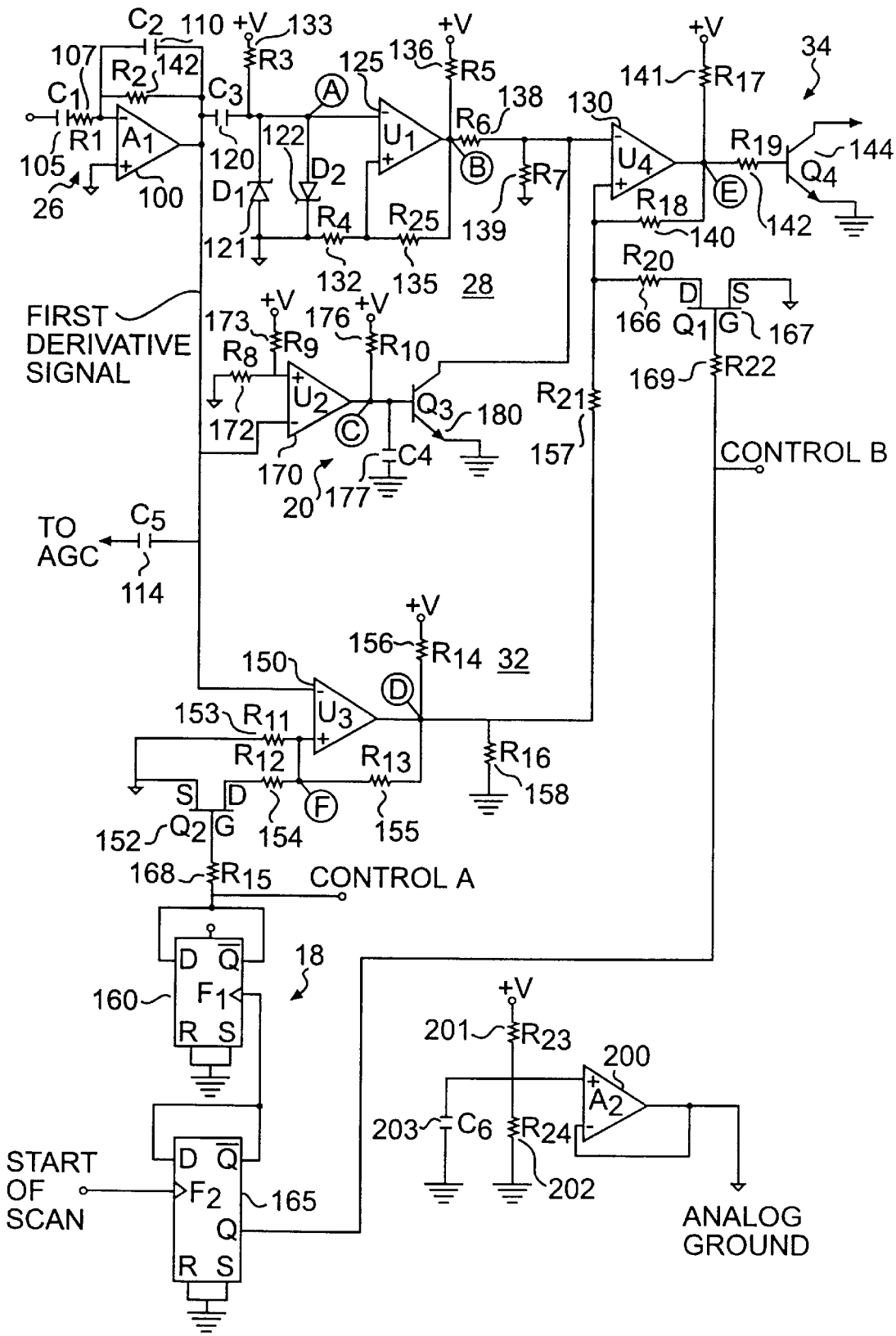
FIG. 4 is a detailed circuit diagram of the digitizer circuit and control circuit of FIG. 2.

FIG. 4 shows a detailed diagram of digitizer circuit 16 and control circuit 18 of FIG. 1, that can be used in the digitizer 14 to digitize detected analog signals from optical system 12. The values provided in the parenthesis for the various components are exemplary only and other suitable values may be used.

The digitizer circuit 16 receives as input a first derivative signal from the first derivative circuit 26. The first derivative circuit 26 includes an amplifier 100, such as TLC274, with a series connections of a capacitor 105 (0.1 uf) and resistor 107 (10 k ohms) at the inverting input. The inverting input also connects to the output of the amplifier 100 through a parallel connection of a capacitor 110 (18 pf) and resistor 112 (150 k ohms) in a feedback configuration. The non-inverting input is connected to analog ground. Analog ground is defined as shown in FIG. 4 and is the output of amplifier 200. The non-inverting input to amplifier 200 is a resistor 202 (22.1 k ohms) in parallel with a capacitor 203 (0.1 uf) which is in turn tied to +V (5 volts) through a resistor 201 (33.2 k ohms). The inverting input is connected to the output of the amplifier 200.

The digitizer circuit 16 includes the first thresholding circuit 28, the second thresholding circuit 32, and the signal output circuit 34. Control circuit 18 is connected to the signal output circuit 34 through a field effect transistor 167. In an alternative embodiment the field effect transistor 167 may be replaced by a mechanical switch or a PN junction, for example.

The first thresholding circuit 28 performs a diode thresholding technique. The first thresholding circuit 28, which receives the first derivative signal, includes a capacitor 120 (0.01 uf), clamping diodes (Schottky diodes) 121 and 122, and a comparator 125 (LM339). The inverting input of comparator 125 is connected to the capacitor 120 and the non-inverting input of the comparator 125 is connected to analog ground through a resistor 132 (27 k ohms). The inverting input of the comparator 125 is also tied to +V (5 volts) through a resistor 133 (1M ohms). The non-inverting input of the comparator 125 is also connected to its output through a resistor 135 (1M ohms) in a feedback configuration. The output of the comparator 125 in turn is tied Do +V (5 volts) through a resistor 136 (10 k ohms).

The output of the comparator 125 connects to the inverting input of comparator 130 (LM339) through a resistor 138 (18.2 k ohms) which is connected to ground via resistor 139 (18.2 k ohms). The non-inverting input of comparator 130 is connected to its output through a resistor 140 (18.2 k ohms) in a feedback configuration.

The output of the comparator 130 is also tied to +V (5 volts) through a resistor 141 (5.11 k ohms), and also connects to resistor 142 (22.1 k ohms) connected to a transistor 144. The signal output circuit 34 includes the comparator 130, resistor 142 and transistor 144.

The second thresholding circuit 32 performs a diode thresholding technique and a high thresholding technique. The second thresholding circuit 32 includes the first thresholding circuit 28 and a comparator 150.

The hysteresis circuit includes a field effect transistor 152 and resistors 153 (470 k ohms), 154 (1M ohms) and 155 (1M ohms), which control the hysteresis curve. The field effect transistor 152 may also be a mechanical switch or a PN junction, for example. The gate of the field effect transistor 152 is connected to the resistor 168, the drain is connected to the resistor 154, and the source is connected to analog ground. Resistors 153 and 154 connect to the non-inverting input of the comparator 150. Resistor 155 connects the non-inverting input and the output of the comparator 150 in a feedback configuration. The inverting input of the comparator 150 is connected to the first derivative signal and the output is tied to +V (5 volts) through a resistor 156 (10 k ohms). The output of the comparator 150 is also connected to the non-inverting input of comparator 130 through a resistor 157 (18.2 k ohms), and is tied to ground through resistor 158 (39.2 k ohms).

The control circuit 18 includes the hysteresis circuit described above, a pair of flip-flops 160 and 165, a field effect transistor 167 and two control terminals A and B. The "D" inputs of the flip-flops connect to their complementary outputs, and the input of flip-flop 165 is connected to the clock of flip-flop 160. The input of flip-flop 160 is connected to the gate of field effect transistor 152 through a resistor 168 (1M ohms).

The output of the flip-flop 165 is connected to the gate of the field effect transistor 167 through a resistor 169 (1M ohms). The drain of the field effect transistor 167 is connected to the non-inverting input of comparator 130 through resistor 166 (100 ohms). The source of the field effect transistor 167 is connected to analog ground. Control terminals A and B are controlled by the control circuit 18 and receive sensitivity control signals, and connect to the gate of the field effect transistor 152 through resistor 168 and to the base of the field effect transistor 167 through resistor 169, respectively. In an alternate embodiment which does not use flip-flops, the control terminals A and B are controlled by the decoder 22.

FIG. 4 also shows margin threshold circuit 20, which can be used in the digitizer 14 to generate a digitized bar pattern with clean margins. Margin threshold circuit 20 includes a comparator 170, one input (inverting) of which is supplied with the first derivative signal, and the other input (non-inverting) of which is grounded through a resistor 172 (15 k ohms). Resistor 172 is connected to a resistor 173 (100 k ohms) in a voltage divider configuration and the values of 172 and 173 can be selected to provide a desired margin threshold. The output of comparator 170 connects to +V (5 volts) through resistor 176 (22.1 k ohms), and to ground through capacitor 177 (0.22 uf). The functions of these elements are described below.

The output of comparator 170 is also connected to the base of a transistor 180 having a collector connected to the signal output circuit 34 (FIG. 2), shown as the inverting input of comparator 130. Accordingly, the margin threshold circuit 20 turns off the output of the digitizer circuit 16 when the amplitude of the first derivative signal is less than a threshold value, for example, 0.7 V, to make a digitized bar pattern with clean margins.

The operation of the digitizer 14 is described with reference to FIGS. 4–7. The first operation we consider is when a good quality symbol is scanned in a middle working range. Under these circumstances, the signal modulation is good and noise due to printing defects is minimal. For scanning a good and clear symbol the field effect transistor 167 should initially be on in order to maximize the depth of focus.

Figure 5:
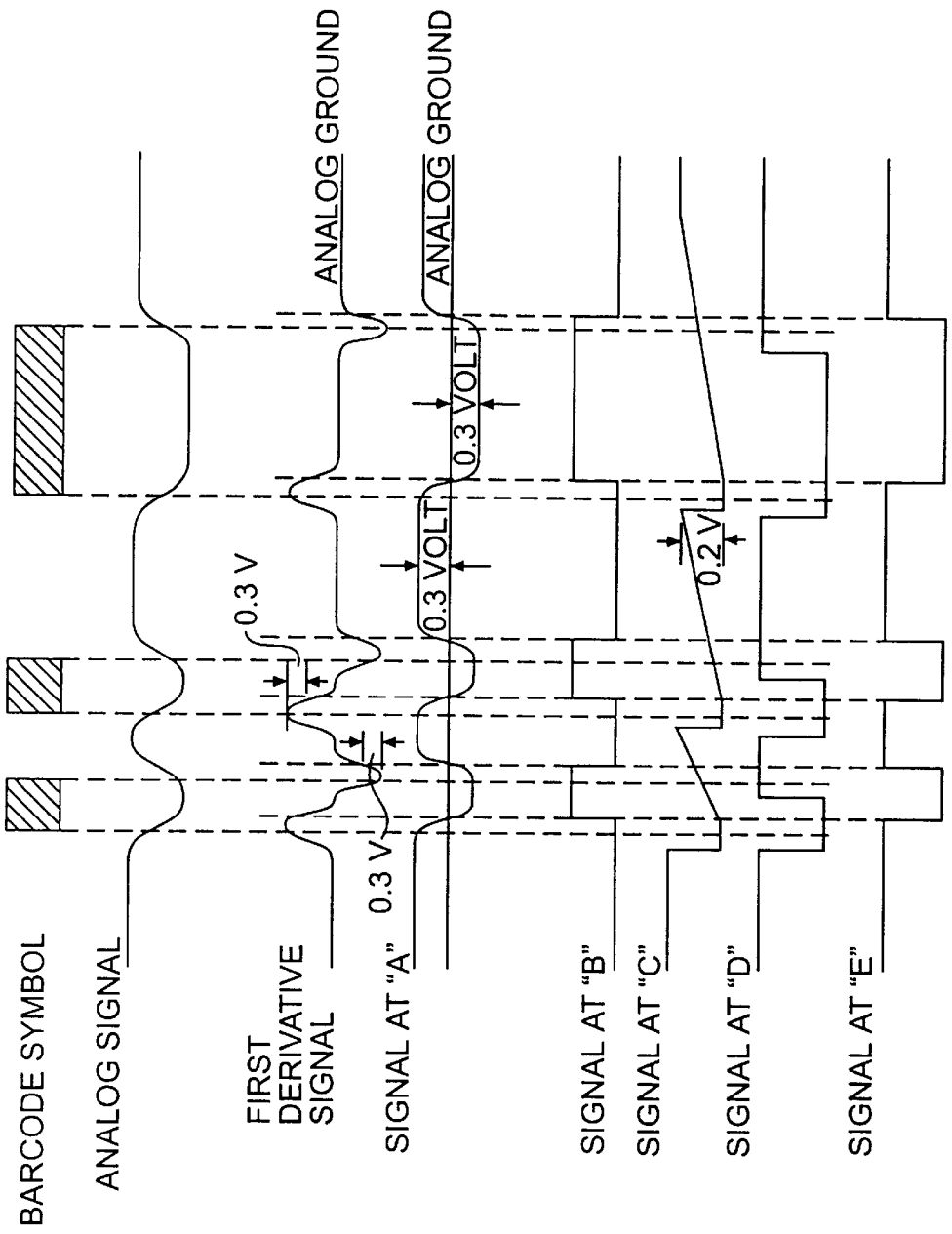
FIG. 5 is a waveform diagram of the digitizer circuit of FIG. 4.

Referring to FIG. 5, the waveform marked "Analog Signal" shows an output of a photodiode preamplifier (not shown). The amplitude of this analog signal may be only a few millivolts, depending upon the distance between the scanner and the symbol. The analog signal is amplified, filtered and differentiated through the signal receiving unit 25 and the first derivative circuit 26. Also, an automatic gain control (AGC, not shown) regulates the resultant signal, passed through capacitor 114 (0.022 uf), to produce a first derivative signal of about 2.5 volts peak to peak, for example, centered around analog ground, as shown in FIG. 5. The first derivative signal is applied to the digitizer circuit 16 and the margin threshold circuit 20.

Referring to FIG. 4, the first derivative signal is fed through capacitor 120 to the circuit node marked "A." At "A," the signal is clamped by two Schottky Diodes 121 and 122 to within about 300 mV of analog ground, resulting in the waveform marked signal at "A" in FIG. 5. Voltage comparator 125 compares the signal at "A" to analog ground, resulting in the waveform marked signal at "B." The signal at "B" is a square wave of about 5 volts peak to peak and is delayed slightly with respect to the peaks of the first derivative signal. This is because the signal at "A" crosses analog ground only when the first derivative (1) has come down one diode drop (300 mV) after a positive peak or (2) has gone up one diode drop (300 mV) after a negative peak. The signal at "B" is a slightly delayed square wave corresponding to the original analog signal.

The portion of the first-thresholding circuit consisting of the two diodes 121 and 122, the capacitor 120 and the comparator 125 detects the edges of the bars and spaces from the first derivative signal. The diodes 121 and 122 are used to locate the peaks of the first derivative signal. Comparator 125 trips near the peaks of the first derivative because the forward drops of the two diodes (300 mV) is small with respect to the overall amplitude of the first derivative signal which is regulated at 2.5 V peak to peak. Therefore, the output of the comparator 125 is an accurate representation of the widths of the bars and spaces of the symbol being scanned and can be passed directly to the decoder for decoding.

There are at least two modes of operation. The most sensitive mode is also called the low thresholding mode. In this mode, if the signal at "B" is noise-free and defect-free, as shown in FIG. 5, it may be used directly by the decoder 22 to decode the symbol being scanned. This mode is important because it provides excellent depth of focus and the ability to digitize very narrow bars or spaces. However, it is sensitive to printing defects so it may not work well on poorly printed symbols.

The less sensitive mode is called a high thresholding mode. Thus in the high thresholding mode, additional circuitry is used to detect which of the responses of comparator 125 result from the real symbol and which responses result from defects. When defects are detected, the additional circuitry can be used to ignore the responses of comparator 125 that resulted from the defects. This prevents defective information from reaching the decoder 22.

The circuitry including comparators 170, 150 and 130 in FIG. 4, along with the associated components, detects possible defects and prevents the digitizer 14 from responding to such defects. To do this, it is assumed that signal modulation due to printing defects is smaller than the modulation due to the real symbol. Experiments using a large number of poor quality symbols have verified this assumption.

Figure 6:
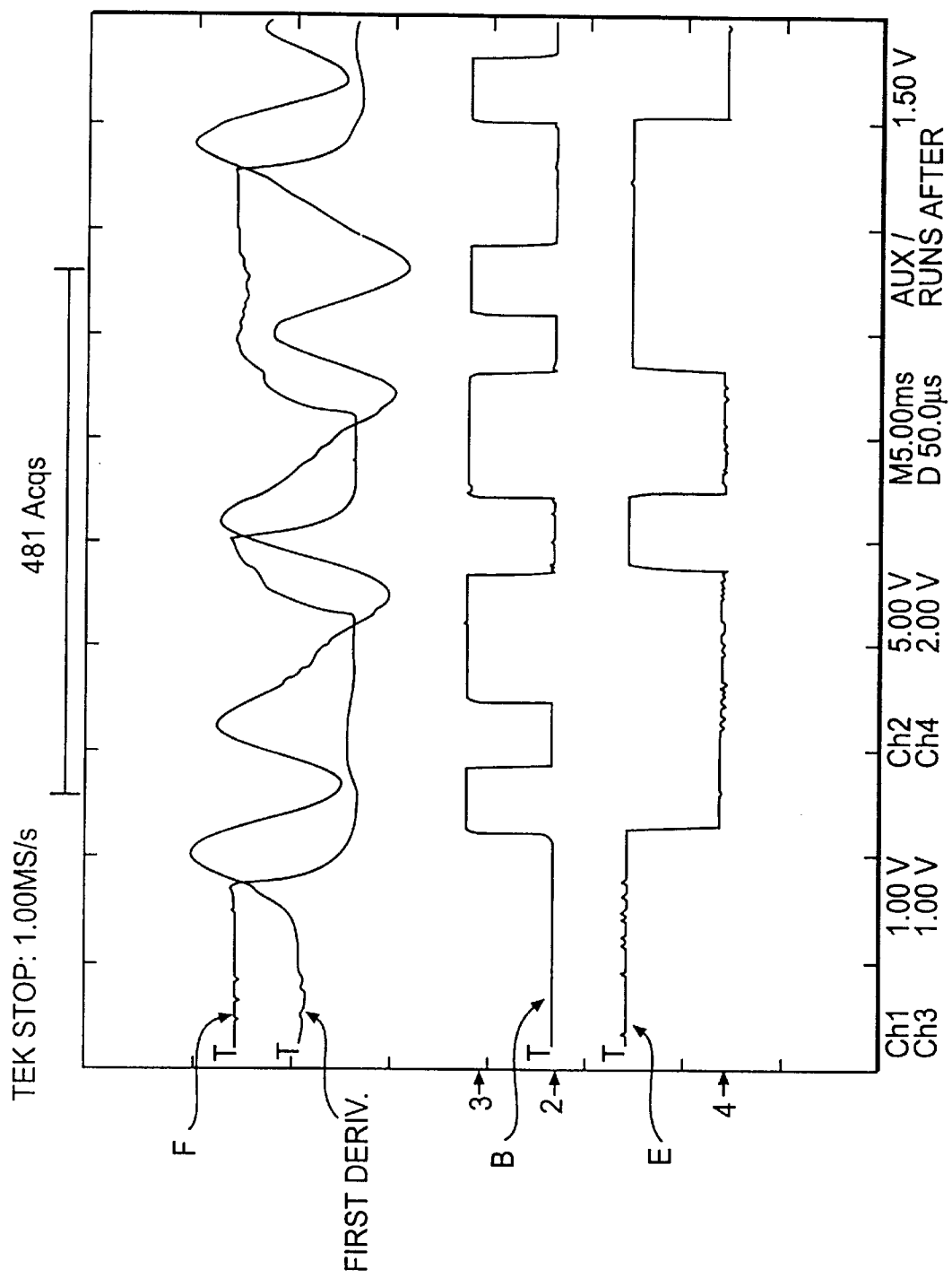
FIG. 6 is a waveform diagram comparing the first and second modes of operation of the digitizer circuit of FIG. 4.
Figure 7:
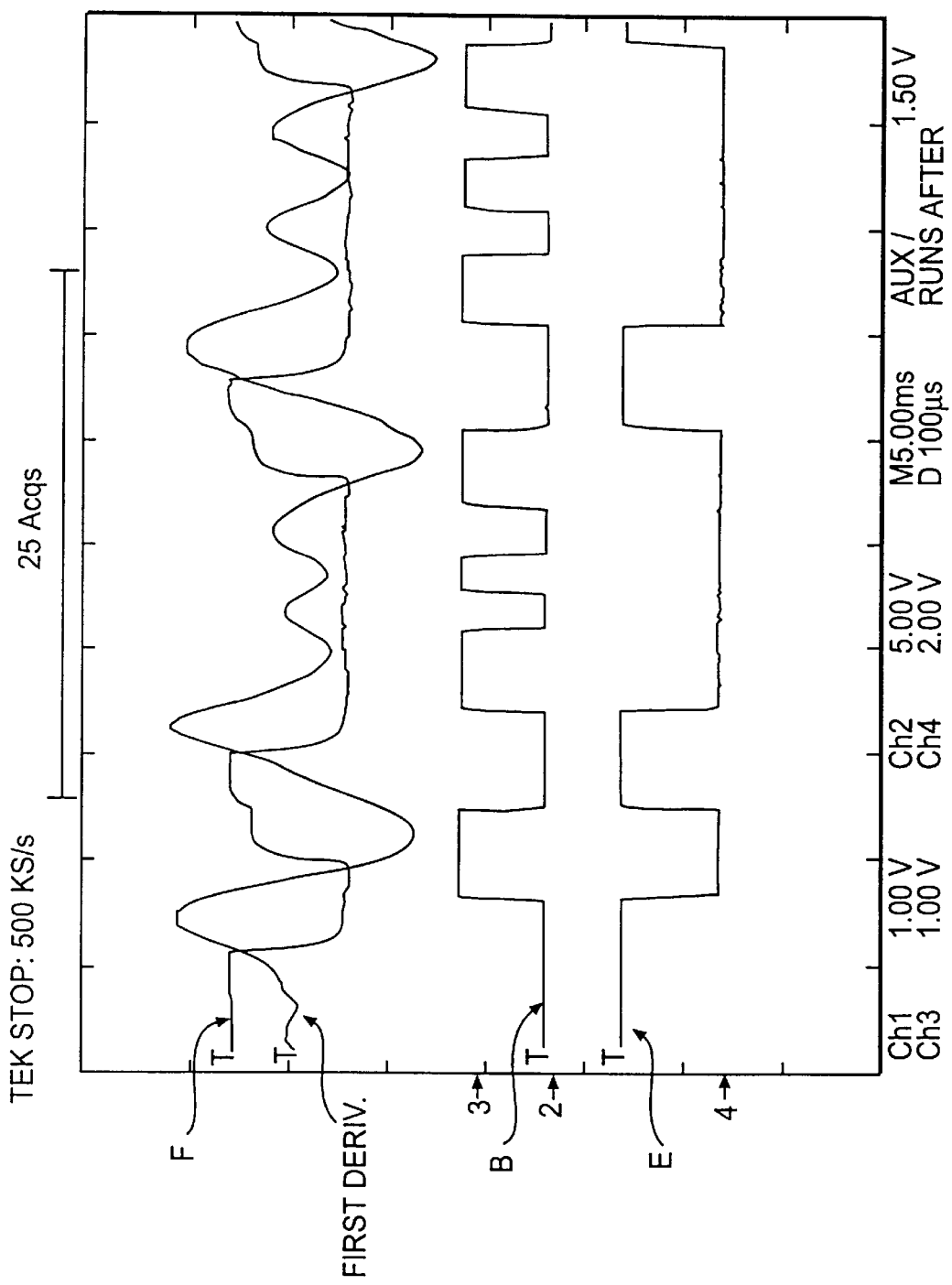
FIG. 7 is another waveform diagram comparing the first and second modes of operation of the digitizer circuit of FIG. 4.

The first derivative signal is applied to the inverting input of voltage comparator 150. The comparator 150 is set up with a hysteresis according to field effect transistor 152 and resistors 153, 154, and 158. Examples of the hysteresis is shown in FIGS. 6 and 7 as waveform "F." The first derivative signals that exceed the hysteresis will trip comparator 150, but smaller signals will not. The hysteresis is chosen so that the 2.5 volt peak to peak first derivative signal is large enough to trip the comparator 150, but modulation due to defects (which is smaller) will not.

The waveform marked signal at "D" in FIG. 5 shows the output of comparator 150. Note that the signal at D transitions just before the peaks of the first derivative signal. This occurs when a rising signal exceeds the hysteresis level to comparator 150. Also, the polarity of the signal at "D" is opposite the signal at "B." In other words, a falling edge at "D" precedes a rising edge at "B" and a rising edge at "D" precedes a falling edge at "B."

The signal output from comparator 150 is not passed directly to the decoder because the output is not as accurate a representation of the edge locations as that output by comparator 125. The output of comparator 150 is less likely to be affected by printing defects and is used to gate off transitions at point "B" which are due to printing defects.

Voltage comparator 130 is designed such that its output will change state either (1) on the first rising transition of point "B" following a falling transition of point "D" or (2) on the first falling transition of point "B" following a rising transition of point "D." This means that as long as all of the modulations of the first derivative signal are large enough to trigger both comparators 125 and 150, the output of comparator 130 (point "E") will be an inverted copy of the output of comparator 125 (point "B"). This is illustrated in FIG. 5.

However, printing defects that produce a signal modulation insufficient to exceed the hysteresis of comparator 150 will not trigger a transition at the output of comparator 150. When this occurs, comparator 130 will not respond to transitions at the output of comparator 125 that are in response to such small levels of modulation. Accordingly, the comparator 130 produces an inverted copy of the output of comparator 125, but without any of the transitions that resulted from comparator 125 responding to modulation levels lower than the hysteresis level to comparator 150. Therefore, this design properly detects the real edges of the bars and spaces being scanned and ignores defects as long as they are small with respect to the real edges.

The circuit described above performs well when scanning symbols located near the scanner laser beam waist (where modulation due to defects is greatest). It can ignore defects that modulate the first derivative signal to levels in the order of 50% to 75% of the true edges. However, there are times when it is undesirable to ignore the small peaks of the first derivative signal. For example, when scanning a bar code symbol with a laser spot that is wider than the narrow bars and spaces in the symbol, the narrow bars and spaces produce modulation lower in amplitude than the wide bars or spaces. This occurs when either very high density symbols (symbols with very narrow bars and spaces) are being scanned or a symbol at an extended depth of focus or whenever any symbol is being scanned far from the laser beam waist where the beam spot grow large. Detecting these small peaks will allow the scanner to decode symbols over a greater total range.

The digitizer 14 can be switched into the most sensitive mode at which it can detect peaks as small as about 300 mV within a 2.5 volt peak to peak signal. When in this mode, the depth of field is significantly improved over the high threshold mode, but it is also more likely to detect defects if the symbol quality is poor.

To enable the most sensitive mode, field effect transistor 167 is turned on, shorting the non-inverting input of comparator 130 to analog ground. The comparator 130 is now unaffected by transitions at the output of comparator 150. Accordingly, comparator 130 merely inverts transitions that occur at its inverting input. The inverting input of the comparator 130 receives the output signal of comparator 125, which responds to signal modulations as small as about 300 mV.

In either the most sensitive mode or the high threshold mode, the digitizer 14 must deliver digitized signals to the decoder 22 that are free from false transitions in the "quiet zones" around the printed symbol. Decoders often use these quiet zones to help distinguish the symbol from surrounding graphics. The margin threshold circuit 20 including voltage comparator 170 and its associated components keeps the digitizer 14 from responding to dirt, paper grain, or half tone printing, for example, that may exist in the quiet zones. The margin threshold circuit 20 functions as follows.

The non-inverting input of comparator 170 is offset above analog ground by resistors 172 and 173. The first derivative signal is centered around analog ground and hence, comparator 170 will be tripped only when the modulation exceeds this offset (for example, about 400 mV with the values shown). Thus, when the laser spot is scanning a quiet zone, and as long as the modulation does not exceed the offset voltage, the output of comparator 170 will remain high allowing capacitor 177 to charge through resistor 176 until the transistor 180 is turned on. Because the comparator 170 has an open collector output, when the output transitions to a low level, an internal output transistor forces the output to ground. When the output transitions to a high level, the comparator 170's internal transistor must be pulled up by an external resistor (in this case, the resistor 176).

When the peak of the first derivative signal, which occurs when the laser spot moves onto the first bar of the symbol, exceeds the offset voltage, the output of comparator 170 goes low, and transistor 180 immediately turns off. After the peak passes, the output of comparator 170 becomes high allowing the capacitor 177 to charge through the resistor 176. Resistor 176 and capacitor 177 are chosen to delay turning on transistor 180 for a time longer than the time between successive positive peaks of the lowest density symbol (the symbol with the widest bars and spaces) to be scanned. As a result, transistor 180 turns off just before the leading edge of the first bar is detected, and turns on after capacitor 177 charges up to 0.7 volts following the last bar in the symbol. This is shown by signal "C" in FIG. 5.

When the transistor 180 turns on, it pulls the inverting input of comparator 130 to ground causing the output of comparator 130 to go high. As shown in FIG. 5, the output of comparator 130 (signal at "E") is high when scanning a white area. Comparator 170 and its associated components force the digitizer circuit 16's output high (white) in the quiet zones as long as modulation in the quiet zone is less than the offset voltage set by the two resistors 172 and 173 at the non-inverting input of comparator 170.

The two modes of operations described above enable a scanner to decode a range of poor quality symbols that would be impossible with any single threshold scanner. FIGS. 6 and 7 illustrate this point.

FIG. 6 shows actual oscilloscope traces obtained for a signal in which all of the peaks of the signal must be detected in order to decode the symbol—the most sensitive mode. For example, this could be a symbol having (1) narrow bars and spaces or (2) a good quality print positioned far from the beam waist. Some of the peaks are too short to cross the signal "F" (the hysteresis curve of comparator 150) and thus are improperly omitted from signal "E." Signal "B" however, has properly detected every peak. If field effect transistor 167 had been turned on when these waveforms were captured, signal "E" would have been an inverted copy of "B" and would have been decodable.

FIG. 7 shows actual oscilloscope traces obtained by scanning a dot matrix symbol located near the scanner laser beam waist. The traces are labeled according to where they were observed in the digitizer circuit 16 of FIG. 4. The small peaks on the first derivative signal resulted from the laser resolving the individual dots the printer used to create the bars of the symbol—the defects. To decode this symbol, the scanner must ignore these small peaks but respond to the large peaks which indicate the real bar edges.

In FIG. 7, signal "F" is the hysteresis curve of comparator 150. If the first derivative signal does not cross signal "F," comparator 150 does not trip. Signal "B" is the output of comparator 125. Note that comparator 125 (signal "B") responds to the desired large peaks as well as to the undesired small peaks. Signal "E" is the output of comparator 130. It corresponds to signal "B" except where "B" responded to peaks that were too small to trip comparator 150. Signal "E" has successfully ignored the small peaks of the first derivative signal and is a decodable signal. If field effect transistor 167 had been turned on when these waveforms were captured, however, signal "E" would have been an inverted copy of signal "B" which would have been undecodable.

Thus, by switching between the two operating modes, both of these symbols, as illustrated in FIGS. 6 and 7, can be decoded. Preferably, the digitizer circuit of the present invention should be used with laser optics having a laser spot whose length is greater than its width throughout the working range of the scanner. This tends to minimize the size of peaks on the analog signal that are due to printing defects with respect to the peaks from real bar edges. This also makes it easier to distinguish the real bar edges from the defects which will increase the accuracy of the digitizers to detect all the needed peaks and none of the unwanted ones.

A scanner that combines the digitizer circuit described above with a laser system, such as the one with a cylindrical scan mirror can achieve a level of superior performance.

Accordingly, a scanner using the digitizer circuit of the present invention can read symbols with print defects near the beam waist and obtain large depths of focus. The digitizing circuit changes its behavior from that of a sensitive diode thresholding digitizer circuit to a high threshold digitizer circuit, depending on the state of the control terminals A and B in FIG. 4. When the control terminal 3 is high (5 volts), digitizer 16 acts like a sensitive diode thresholding digitizer. When the control terminal 3 is low, however, digitizer circuit 16 will not respond unless the signal modulation is greater than a predetermined level. The control terminal marked "Control A" is used to set the high threshold at one of two different levels to allow an intermediate level in the threshold mode. Therefore, the control signals determine a symbol resolution quality of the scanned symbol and select the appropriate sensitivity value.

Of course, more than two modes of sensitivity may be used. The dual flip-flop 160 and 168 of the controller in FIG. 4 is used to step the control terminals through a sequence of varying threshold sensitivities. Table I shows an example of a sequence of varying threshold sensitivities.

TABLE I

| SCAN No. | SCAN DIRECTION | THRESHOLD USED |
|---|---|---|
| 1 | Left to Right | Sensitive, Large Depth of Field |
| 2 | Right To Left | Sensitive, Large Depth of Field |
| 3 | Left To Right | Defect Immune, Small Depth of Field |
| 4 | Right To Left | Defect Immune, Small Depth of Field |
| 5 | Left to Right | Sensitive, Large Depth of Field |
| 6 | Right To Left | Sensitive, Large Depth of Field |
| 7 | Left to Right | Medium Sensitivity, Medium D.O.F. |
| 8 | Right To Left | Medium Sensitivity, Medium D.O.F. |
| 9 | Repeat Sequence | |

Note that the flip-flops 160 and 168 are clocked by a start-of-scan (S.O.S.) signal. This causes the threshold only at the start of a new scan. Therefore, the selection of a sensitivity mode occurs synchronously with a beginning of a scan of the bar code symbol by the bar code reader. However, the flip-flops can be clocked using an end-of-scan (E.O.S.) signal which causes the threshold sensitivity to change only at the end of a scan. The selection of a sensitivity mode would then be synchronous with the end of a scan of the bar code symbol by the bar code reader.

The control terminals may be controlled by a microprocessor eliminating the need for the flip-flops. The microprocessor 2 is shown in combination with the control circuit/mode selector 18 in FIG. 1. The control circuit/mode selector 18 may also include a manual input device 17 shown in FIG. 2 to allow a user to select a mode. The microprocessor may change thresholds as a new scan begins or ends, similar to the flip-flops. Alternatively, one threshold or a sequence of thresholds may be selected according to the user. For example, if a dot matrix printed symbols are primarily being scanned, the user scan manually program the scanner to use the high threshold more often. Or, if good quality, high density symbols are being scanned, the scanner can be programmed to use the most sensitive threshold sensitivity. Scanner programming can be done by -scanning special bar code symbols or by sending special control commands through a communications link with a host computer.

The microprocessor can also intelligently select its own threshold by examining the data from the scanner and making a determination about the kind of symbol that is being scanned. The microprocessor selects the appropriate threshold sensitivity according to the determination. Alternatively, the microprocessor can keep track of which threshold sensitivity has been most successful in the past and use that threshold sensitivity most frequently.

Performance improvements can also be obtained in decoding poorly printed bar codes, such as dot matrix printed codes, by means of identifying and eliminating printing imperfections. In general, most failures to decode dot matrix types of symbols are caused by one or more splits in bars that are due to imperfections in the print process, such as from a printer head or ink. For example, dot matrix printers use multiple mechanical heads that are separated from each other by some small distance during the print process. On paper, these gaps are mostly filled due to ink spreading on the paper. However, due to worn heads or ink ribbons, the gaps may still remain and therefore be detected by the scanner-decoder systems.

As shown in FIG. 8, a void in a bar causes a very narrow "white" element to appear in the middle of the bar. This void mostly occurs in wide bars because they include two or more columns of dots. When the small spaces between the columns are large enough to be detected, they cause a wide bar to appear as a series of bars with very small spaces in between.

Figure 9:
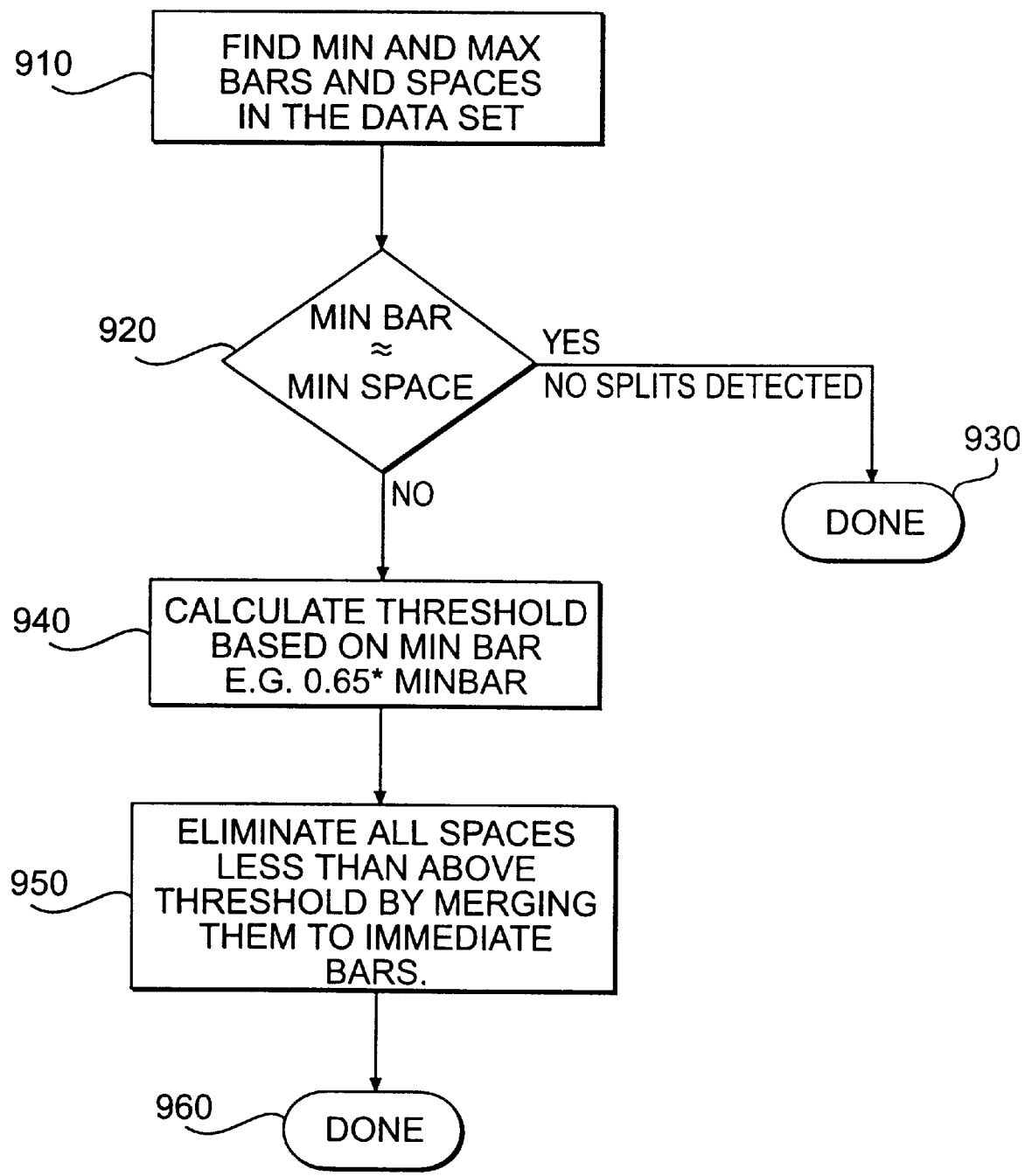
FIG. 9 is a flow diagram of a method consistent with the present invention for detecting and eliminating imperfections in a scanned bar code.

FIG. 9 shows the process, consistent with this invention, for detecting and eliminating the imperfections caused by narrow "white" elements in the middle of a bar. First, a global filter system determines the size of the smallest (minimal) and largest (maximal) legal element size for bars and spaces of any given data set based on one or more global features (step 910). Then, the minimum bar size and minimum space size are compared. In the preferred embodiment, the minimum bar and space sizes are checked to determine if they are approximately equal (step 920). The bar and space size are approximately equal when the difference in size is relatively small, such as less than 35 percent different. Based on the comparison, a threshold may be calculated. If the minimum size of the bar and the space are approximately equal, then no splits have been detected and the process is complete (step 930).

However, if there is a sufficient disparity between the minimum bar size and space size, a threshold is calculated based, for example, on the minimum bar size (step 940). For example, the threshold could be set to the product of 0.65 and the minimum bar size. Each space is then compared to the calculated threshold, and each space less than the threshold is merged into the adjacent bars (step 950). Once the comparison and merging is performed, the process is complete (step 960). Based on this process, any white (space) element that is smaller than the calculated threshold is merged with the surrounding bar (black) elements, thus eliminating the imperfections from the detected code. This process may be implemented in software, such as with software algorithms, in hardware, such as with logic devices, or with some combination of software and hardware.

Figure 10:
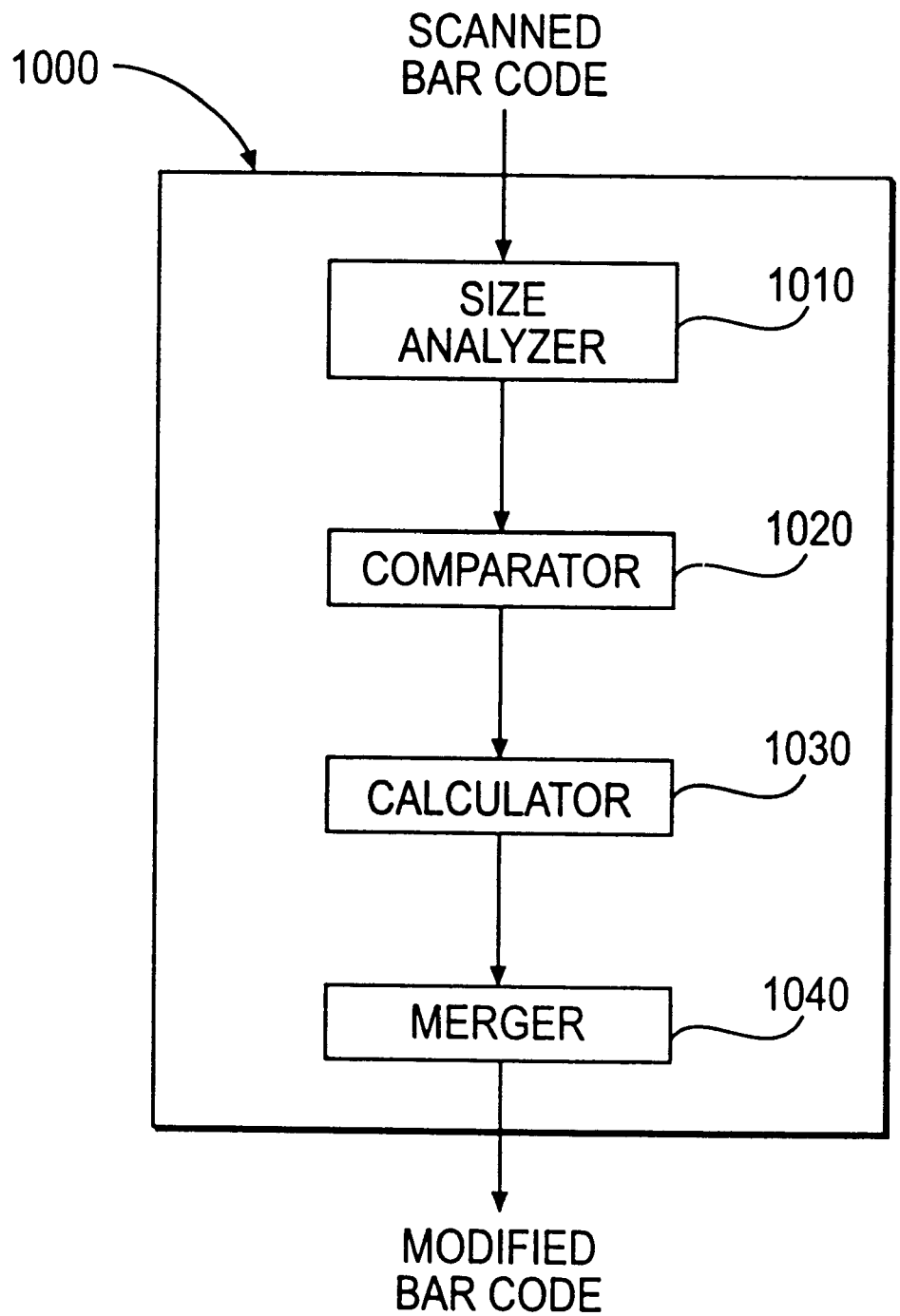
FIG. 10 is a block diagram of a filter system for a bar code reader consistent the present invention.

FIG. 10 shows a block diagram of a filter system 1000, consistent with the present invention, for implementing the process of FIG. 9. Filter system 1000 includes a size analyzer 1010, a comparator 1020, a calculator 1030, and merger 1040. Each of the elements included in filter system 1000 may be implemented in hardware and/or as a software module.

Size analyzer 1010 determines the size of the smallest and largest bar and space of a scanned bar code. Size analyzer 1010 communicates these sizes to comparator 1020. Based on the information from size analyzer 1010, comparator 1020 determines whether the smallest bar size and smallest space size are approximately equal, the sizes being approximately equal if their difference is within a certain range, such as 35 percent. If the sizes are approximately equal, comparator 1020 provides an indication to calculator 1030 to calculate a threshold value based, for example, on the product of 0.65 and the smallest bar size. Merger 1040 then merges any space in the scanned bar code that has a size less than the calculated threshold value into the adjacent or surrounding bars of the scanned bar code. Merger 1040 produces a modified bar code, which can be processed further by the bar code reader, such as to perform decoding.

Filter system 1000 thus provides more accurate decoding for a bar code reader by detecting and eliminating imperfections in the scanned bar code.

It will be apparent to those skilled in the art that various modifications and variations can be made in the data services system and method of the present invention without departing from the spirit or scope of the invention. The present invention covers the modifications and variations of this invention provided they come within the scope of the appended claims and their equivalents.

What is claimed is:

1. A bar code reader for detecting and eliminating imperfections in a scanned bar code symbol, comprising:

means for determining a smallest bar and a smallest space in the scanned bar code symbol;

a first circuit configured to provide an indication based on a comparison of the smallest bar and the smallest space;

a second circuit configured to calculate a threshold based on the indication; and means for merging spaces that are less than the calculated threshold into adjacent bars of the scanned bar code.

2. A bar code reader as recited in claim 1, wherein the first circuit is configured to provide an indication of whether the smallest bar and the smallest space are approximately equal.

3. A method for generating an output digitized signal in a bar code reader corresponding to data encoded in a scanned bar code symbol, comprising the steps of:

determining a smallest bar and a smallest space in the scanned bar code symbol;

comparing the smallest bar and the smallest space;

calculating a threshold value based on the comparison; and merging all spaces that are smaller than the calculated threshold value into adjacent bars of the scanned bar code symbol.

4. A method as recited in claim 3 wherein the comparing step includes the substep of providing an indication of whether the smallest bar and the smallest space are approximately equal.

5. A bar code reader for detecting and eliminating imperfections in a scanned bar code symbol, comprising:

a first circuit configured to provide an indication based on a comparison of a smallest bar and a smallest space in the scanned bar code symbol; and means for merging a space into adjacent bars of the scanned bar code where the space is less than a threshold based on the indication.

6. A bar code reader as recited in claim 5, further comprising:

means for determining a smallest bar and a smallest space in the scanned bar code symbol.

7. A bar code reader as recited in claim 5, further comprising:

a second circuit configured to calculate the threshold based on the indication.

8. A bar code reader as recited in claim 7, wherein the second circuit includes means for setting the threshold to a value equal to a fraction of a width of the smallest bar.

9. A method for generating an output digitized signal in a bar code reader corresponding to data encoded in a scanned bar code symbol, comprising the steps of:

comparing a smallest bar and a smallest space in the scanned bar code symbol; and converting a space into a bar in the scanned bar code symbol where the space is smaller than a threshold value based on a result of the comparison, thereby eliminating an erroneous space in the scanned bar code symbol.

10. A method as recited in claim 9, further comprising the step of:

calculating the threshold value based on the comparison.

11. A method as recited in claim 10, wherein the calculating step includes the substep of setting the threshold value to a value equal to a fraction of a width of the smallest bar.

12. A method as recited in claim 9, further comprising the step of:

determining the smallest bar and the smallest space in the scanned bar code symbol.

13. A computer usable medium having readable code embodied therein for detecting and eliminating imperfections in a scanned bar code symbol, comprising:

a first module configured to provide an indication based on a comparison of a smallest bar and a smallest space of the scanned bar code symbol;

a second module for converting a space into a bar in the scanned bar code where the space is less than a threshold based on the indication.

14. A computer usable medium as recited in claim 13, further comprising:

a third module configured to determine the smallest bar and the smallest space in the scanned bar code symbol.

15. A computer usable medium as recited in claim 13, further comprising:

a fourth module configured to calculate the threshold based on the indication.

16. A computer usable medium as recited in claim 15, wherein the fourth module includes a submodule for setting the threshold to a value equal to a fraction of a width of the smallest bar.

17. A computer data signal embodied in a carrier wave and representing sequences of instructions which, when executed by a bar code reader, causes the bar code reader to perform the steps of:

comparing a smallest bar and a smallest space in a scanned bar code symbol; and treating a space as a bar in the scanned bar code symbol where the space is smaller than a threshold value based on a result of the comparison, thereby eliminating an erroneous space in the scanned bar code symbol.

18. A computer data signal as recited in claim 17, further causing the bar code reader to perform the step of:

calculating the threshold value based on the comparison.

19. A computer data signal as recited in claim 18, wherein the step of calculating the threshold value includes the substep of setting the threshold value to a value equal to a fraction of a width of the smallest bar.

20. A computer data signal as recited in claim 17, further causing the bar code reader to perform the step of:

determining the smallest bar and the smallest space in the scanned bar code symbol.

21. A bar code reader comprising:

a memory having program instructions; and a processor configured to use the program instructions to compare a smallest bar and a smallest space in a scanned bar code symbol; and to treat a space as a bar in the scanned bar code symbol where the space is smaller than a threshold value based on a result of the comparison, thereby eliminating an erroneous space in the scanned bar code symbol.

22. A bar code reader as recited in claim 21, wherein the processor is further configured to use the program instructions to calculate the threshold value based on the comparison.

23. A bar code reader as recited in claim 22, wherein the program instruction to calculate the threshold value includes the subinstruction to set the threshold value to a value equal to a fraction of a width of the smallest bar.

24. A bar code reader as recited in claim 21, wherein the processor is further configured to use the program instructions to determine the smallest bar and the smallest space in the scanned bar code symbol.

25. A method for decreasing sensitivity to imperfections in a bar code symbol, comprising the steps of:

comparing portions of a digital signal, derived from the bar code symbol, corresponding to a smallest bar and a smallest space of the bar code symbol; and changing a signal level of a portion of the digital signal corresponding to a space in the bar code symbol based on a result of the comparison.

26. A method for eliminating imperfections in a scanned bar code symbol, comprising the steps of:

calculating a threshold based on a smallest bar in the scanned bar code symbol;

comparing a space in the bar code symbol to the threshold; and changing the space into a bar in the scanned bar code symbol where the space is smaller than the threshold.

27. A method for modifying a scanned bar code symbol composed of bars and spaces, comprising the steps of:

calculating a threshold based on the smallest bar in the scanned bar code symbol; and merging a space into adjacent bars of the scanned bar code symbol where the space is smaller than the threshold, thereby eliminating an erroneous space in the scanned bar code symbol.

28. A method as recited in claim 27, wherein the steps of calculating and merging are performed prior to decoding the scanned bar code symbol.

29. A method as recited in claim 9, wherein the steps of comparing and converting are performed prior to decoding the scanned bar code symbol.

30. A method as recited in claim 9, wherein the step of converting is repeated for all spaces in the scanned bar code symbol where the space is smaller than the threshold value.

\* \* \* \* \*

UNITED STATES PATENT AND TRADEMARK OFFICE
CERTIFICATE OF CORRECTION

PATENT NO. : 5,952,644
DATED : September 14, 1999
INVENTOR(S) : Edward Barkan

It is certified that error appears in the above-identified patent and that said Letters Patent is hereby corrected as shown below:

Title page, column 1, delete item "[76]" and insert therefor:
-- [75] Inventor: Edward Barkan, Miller Place, N.Y.
   [73] Assignee: Symbol Technologies, Inc., Holtsville, N.Y --

Signed and Sealed this

Twenty-ninth Day of August, 2000

Attest:

Q. TODD DICKINSON

*Attesting Officer*           *Director of Patents and Trademarks*